(12) United States Patent
Jährling et al.

(10) Patent No.: US 9,357,843 B2
(45) Date of Patent: Jun. 7, 2016

(54) PULL-OUT GUIDE FOR FURNITURE PARTS WHICH CAN MOVE RELATIVE TO ONE ANOTHER

(71) Applicant: PAUL HETTICH GMBH & CO. KG, Kirchlengern (DE)

(72) Inventors: Peter Jährling, Bunde (DE); Alexander Hemminger, Halle (DE); Sebastian Bastkowski, Herford (DE)

(73) Assignee: PAUL HETTICH GMBH & CO. KG, Kirchlengern (DE)

( * ) Notice: Subject to any disclaimer, the term of this patent is extended or adjusted under 35 U.S.C. 154(b) by 0 days.

(21) Appl. No.: 14/416,561

(22) PCT Filed: Jul. 12, 2013

(86) PCT No.: PCT/EP2013/064797
§ 371 (c)(1),
(2) Date: Jan. 22, 2015

(87) PCT Pub. No.: WO2014/016141
PCT Pub. Date: Jan. 30, 2014

(65) Prior Publication Data
US 2015/0147009 A1    May 28, 2015

(30) Foreign Application Priority Data

Jul. 25, 2012    (DE) .................. 10 2012 106 751

(51) Int. Cl.
*A47B 88/00*    (2006.01)
*A47B 88/14*    (2006.01)
(Continued)

(52) U.S. Cl.
CPC ............. *A47B 88/14* (2013.01); *A47B 88/10* (2013.01); *F16C 29/005* (2013.01); *F16C 29/04* (2013.01); *A47B 2210/0032* (2013.01)

(58) Field of Classification Search
CPC .... A47B 88/0466; A47B 88/10; A47B 88/14; A47B 2210/0008; A47B 2210/001; A47B 2210/0029; A47B 2210/0032; A47B 2210/0035; A47B 2210/0037; A47B 2210/004
USPC .............. 384/18; 312/334.9, 334.11, 334.15, 312/334.17, 334.25, 334.26, 334.33, 312/334.37, 334.38, 334.45, 334.6
See application file for complete search history.

(56) References Cited

U.S. PATENT DOCUMENTS 2,400,374 A * 5/1946 Selnes .................. F16C 19/505
                                                            384/49
2,762,660 A * 9/1956 Bullock ................. A47B 88/10
                                                            312/334.13
(Continued)

FOREIGN PATENT DOCUMENTS

DE        2656822        6/1978
DE        9112658.4 U1   11/1992
(Continued)

OTHER PUBLICATIONS

Search Report issued in App. No. PCT/EP2013/064797 (2013).

*Primary Examiner* — Janet M Wilkens
(74) *Attorney, Agent, or Firm* — Barnes & Thornburg LLP

(57) ABSTRACT

A pull-out guide for furniture parts which can move relative to one another includes at least two pull-out rails, between which at least one first roller body and at least one second roller body are disposed, which are held in a rotatable manner in at least one roller body cage, the at least one first roller body having a greater nominal diameter and a lower modulus of elasticity than the at least one second roller body of the roller body cage. The pull-out guide is characterized in that a difference in diameter ($\Delta d$) between a first nominal diameter of the first roller body and a second nominal diameter of the second roller body is greater than a lower limit which is at least as great as a manufacturing tolerance ($\Delta d1$) in the diameter of the first roller body.

8 Claims, 7 Drawing Sheets

(51) Int. Cl.
   *A47B 88/10*        (2006.01)
   *F16C 29/00*        (2006.01)
   *F16C 29/04*        (2006.01)

(56) References Cited

U.S. PATENT DOCUMENTS

| | | | | |
|---|---|---|---|---|
| 2,794,690 | A * | 6/1957 | Bullock | A47B 88/10 312/334.9 |
| 4,752,142 | A * | 6/1988 | Jackson | A47B 88/14 384/18 |
| 5,417,489 | A * | 5/1995 | Compagnucci | A47B 88/10 312/334.11 |
| 5,417,496 | A * | 5/1995 | Hobbs | A47B 88/10 384/18 |
| 5,570,943 | A * | 11/1996 | Schroder | A47B 88/10 312/334.11 |
| 5,737,971 | A * | 4/1998 | Riefe | B62D 1/181 280/775 |
| 5,775,788 | A * | 7/1998 | Sasse | A47B 88/14 312/334.11 |
| 8,201,901 | B2 * | 6/2012 | Craddock | A47B 88/10 312/334.11 |
| 8,646,856 | B2 * | 2/2014 | Park | A47B 88/10 312/334.1 |
| 2008/0258592 | A1 * | 10/2008 | Blum | A47B 88/0466 312/334.1 |
| 2010/0054650 | A1 * | 3/2010 | Endres | F03D 11/0008 384/567 |
| 2011/0194791 | A1 * | 8/2011 | Jahrling | A47B 88/10 384/26 |
| 2013/0193824 | A1 | 8/2013 | Koenig et al. | |

FOREIGN PATENT DOCUMENTS

| | | | |
|---|---|---|---|
| DE | 19511999 | * | 1/1996 |
| DE | 3536654 C2 | | 8/2002 |
| DE | 10359962 | | 7/2005 |
| DE | 20-2008-004658 U1 | | 8/2009 |
| DE | 102008053504 | * | 4/2010 |
| DE | 10-2010-042180 | | 4/2012 |
| EP | 2873881 | * | 5/2015 |
| WO | WO 2008/106933 | * | 9/2008 |
| WO | WO 2012/045854 | | 4/2012 |

* cited by examiner

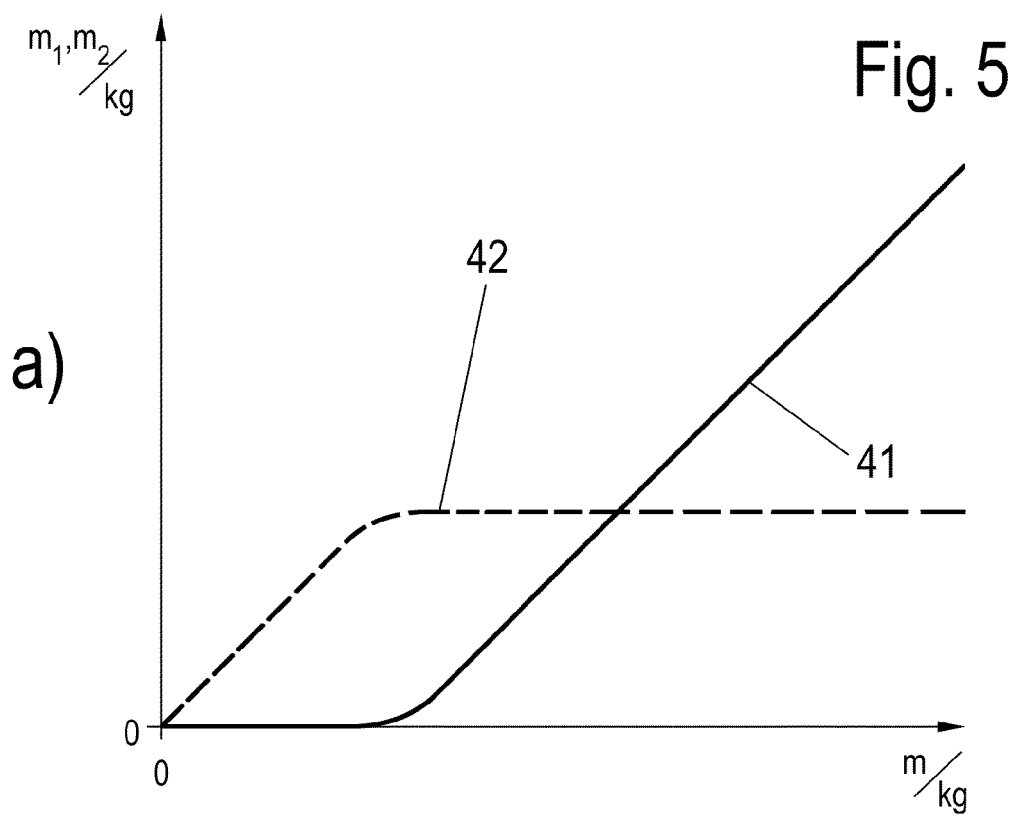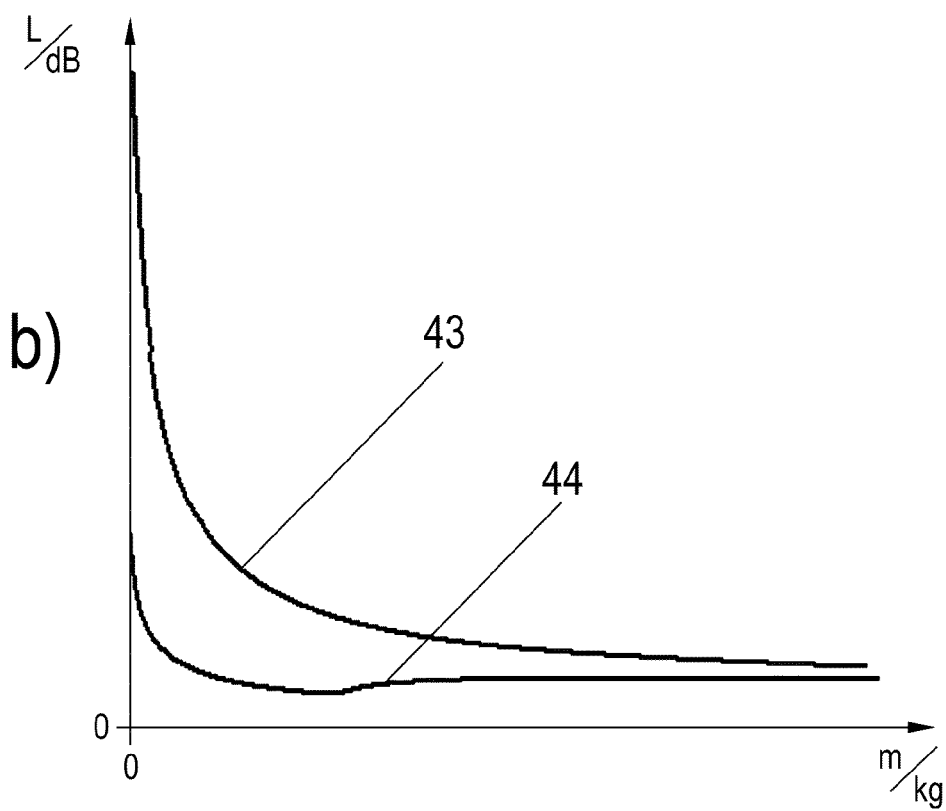
Fig. 5

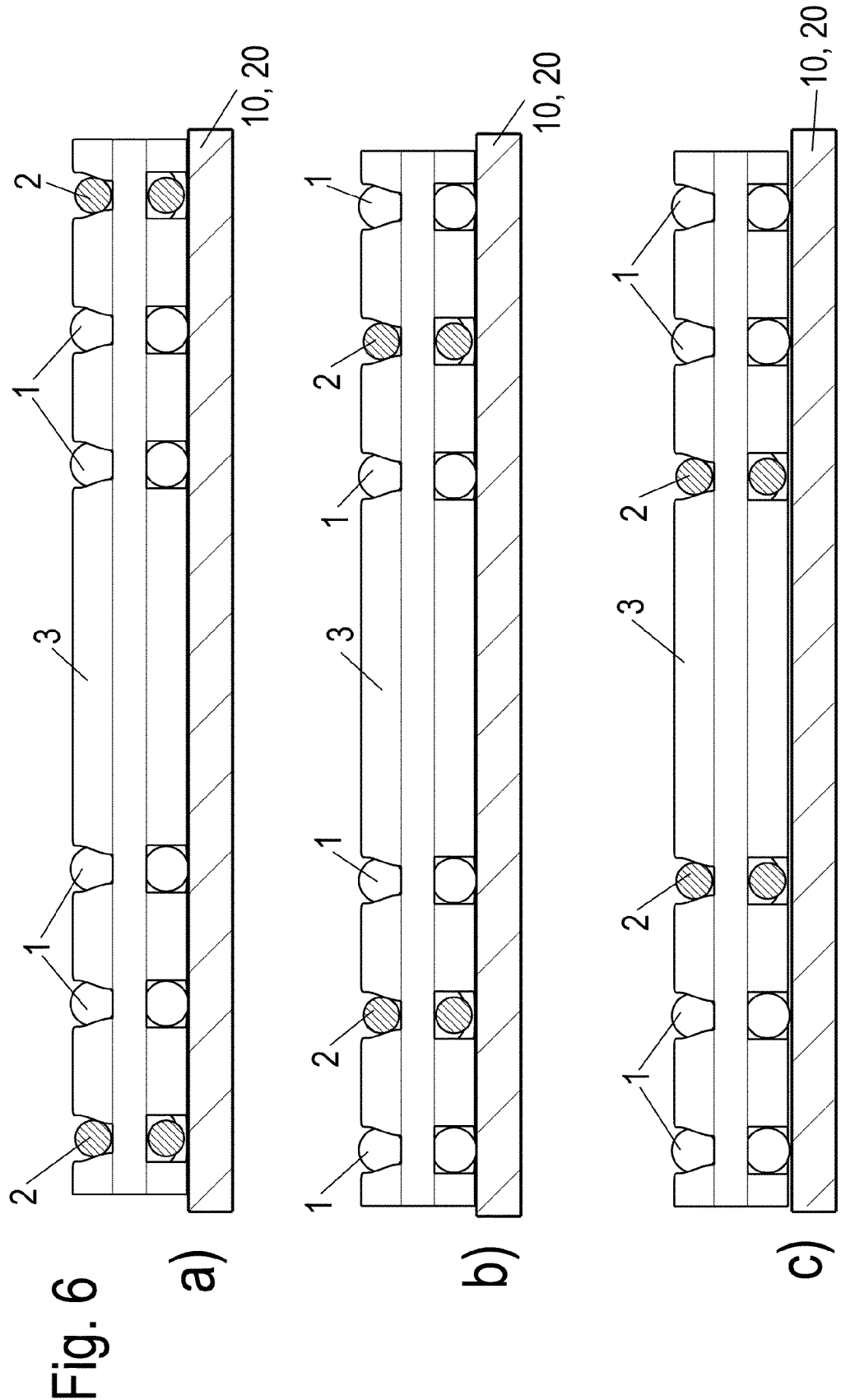

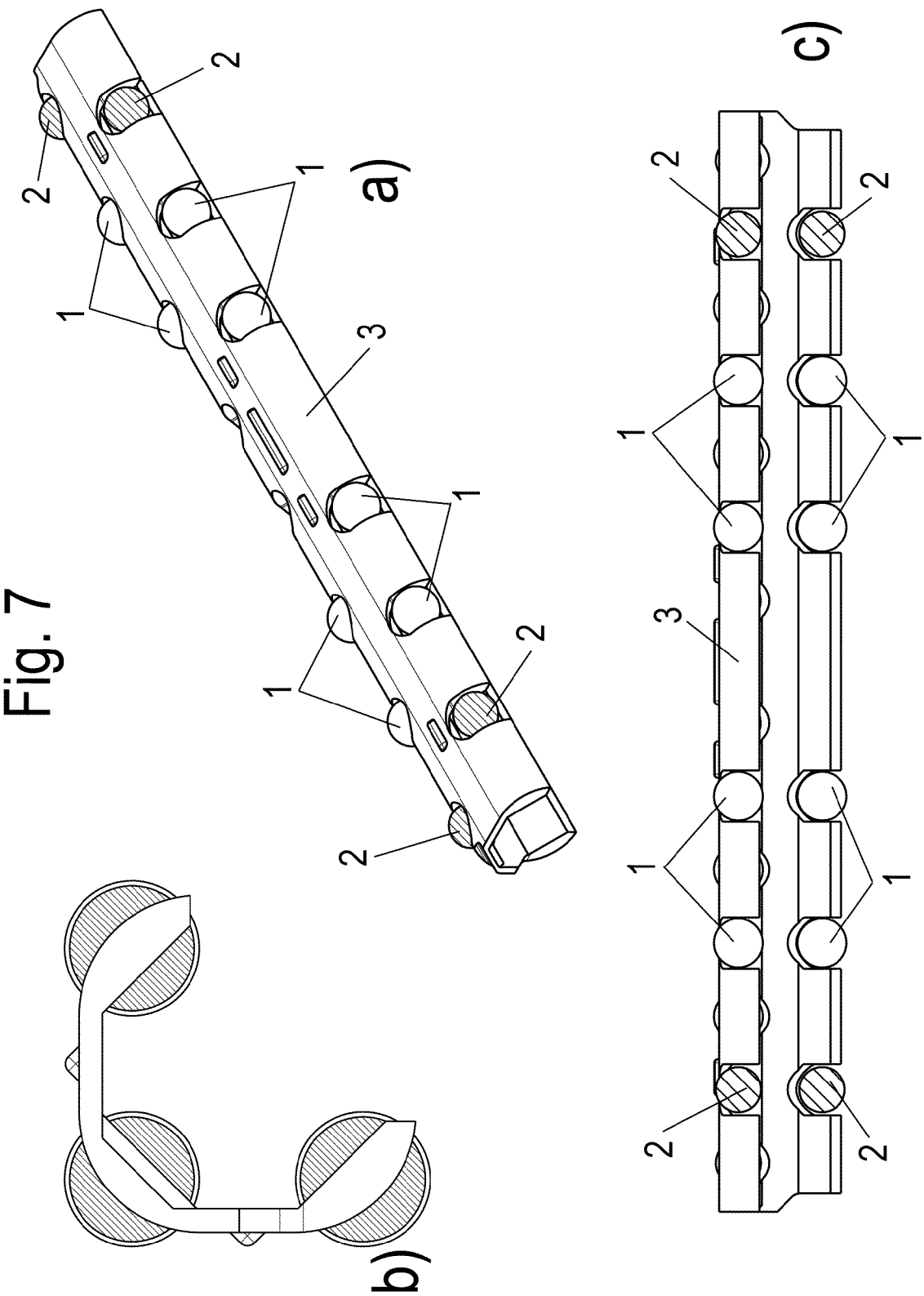

PULL-OUT GUIDE FOR FURNITURE PARTS WHICH CAN MOVE RELATIVE TO ONE ANOTHER

This application is a U.S. nationalization under 35 U.S.C. §371 of International Application No. PCT/EP2013/064797, filed Jul. 12, 2013, which claims priority to German Application No. 10 2012 106 751.1, filed Jul. 25, 2012. The disclosures set forth in the foregoing applications are incorporated herein by reference in their entireties.

BACKGROUND AND SUMMARY OF THE DISCLOSURE

The disclosure is directed to a pull-out guide for furniture parts which can be moved relative to one another. The pull-out guide has at least two pull-out rails and a roller body cage with a plurality of roller bodies, wherein at least one of the roller bodies has a greater diameter and a lower modulus of elasticity than the remaining roller bodies of the at least one roller body cage.

Pull-out guides for furniture parts which can be moved relative to one another such as for drawers which are movably mounted in a furniture body have long been known from the prior art, e.g. from the document DE 3536654 C2. Cylindrical rollers or balls that are rotatably mounted are used as roller bodies in the roller body cage. "Hard" steel balls or rollers with a high modulus of elasticity (MOE) are frequently used because they enable smooth guidance even under high mechanical loading by a heavy weight which is movably mounted by the pull-out guide. Loud rolling noises can be disadvantageous, which can be the stronger the less the pull-out guide is loaded. In the case of drawers as a movable furniture part, a low amount of loading occurs especially in the case of an empty or nearly empty drawer. The rolling noises are amplified in this case by the co-oscillating drawer bottom and the resonant volume that is provided by the empty drawer.

It is known from the document WO2012/04854 A1 for achieving low rolling noises in combination with a preferably low rolling resistance to use two different types of roller bodies in a pull-out guide in a roller body cage, wherein a first type of roller bodies is made of a material of a lower hardness than the roller body or bodies of the second type, and wherein the roller bodies of the first type are larger than the roller bodies of the second type. It is stated with respect to the proportion in size of the two roller bodies that the diameter of the roller bodies of the second type is at least smaller by one-tenth of a percent than the diameter of the roller bodies of the first type. No upper limit is stated in the specification for the diameter of the roller bodies of the second type which have the lower hardness.

Tests have shown that in the case of a difference in size of only one-tenth of a percent between the roller bodies of the two different types depending on the different used materials it is not ensured that the rolling noises of the pull-out guide will decrease. If conversely a difference in size is chosen which is too great, this may result in a destruction of the larger, softer roller bodies.

It is therefore an object of the present disclosure to provide a pull-out guide of the kind mentioned above in which the difference in size of the various roller bodies is specified in such a way that a reduction in the rolling noises is reliably achieved on the one hand and the pull-out guide offers long service life on the other hand, and in particular there is no damage to the larger, softer roller bodies.

A pull-out guide in accordance with the disclosure may be characterized in that a difference in diameter between a first nominal diameter of the first roller body and a second nominal diameter of the second roller body is greater than a lower limit which is at least as great as a production tolerance in the diameter of the first roller body.

It is prevented in this manner that as a result of production tolerances, which occur especially in the case of the softer, first roller bodies to a relatively higher extent because of the material they are made of, the second harder roller bodies prematurely assume the load in the case of an unloaded pull-out guide, which would increase the noise volume when actuating the pull-out guide. It is ensured by taking at least the production tolerance in the diameter of the first roller body into account that especially in the case of an unloaded pull-out guide, e.g. when the drawer is empty, a guidance of the pull-out rails occurs via the first softer roller bodies and in a respectively quiet manner.

In an illustrative embodiment of the pull-out guide, the lower limit is at least as great as the production tolerance in the diameter of the first roller body plus a production tolerance in the diameter of the second roller body and/or plus a minimum amount. As a result, the production tolerance of the second harder roller body can also be considered on the one hand if it is not negligibly low with respect to the production tolerance of the first softer roller bodies. On the other hand, it is ensured by the minimum amount that the reduction in noise is also provided in the case of a slightly loaded pull-out rail. The minimum amount is preferably dependent on the difference of the modulus of elasticity between the first and second roller body and is at least 0.01 mm in an illustrative embodiment.

An upper limit for the difference in diameter is provided in a further embodiment of the pull-out guide. The difference in diameter is preferably smaller at the upper limit than when a yield point of the first roller body is reached during compression of the at least one first roller body to the nominal diameter of the second roller body. It is thus ensured that even in the case of high loading of the pull-out guide, i.e. when the drawer is fully loaded for example, overloading and subsequent destruction of the first softer roller bodies are prevented.

The upper limit may be dependent on a loading of the pull-out guide in which the at least one second roller body is subjected to a pressure load. The loading of the pull-out guide can be adjusted in this manner in which a change of load occurs between the first softer and second harder roller bodies.

Furthermore, the upper limit may be maximally as great as the sum total of the production tolerance in the diameter of the first roller body and a maximum amount, wherein said maximum amount is preferably at most 0.3 mm. These criteria can easily be implemented and ensure for typical material combinations for the first and second roller bodies that the yield point of the first roller body is not reached and a destruction of the first softer roller body is thus prevented.

In a further embodiment of the pull-out guide, the roller bodies between the at least two pull-out rails run on at least two roller body tracks, wherein at least two of the roller bodies situated in succession on one of the roller body tracks are second roller bodies. The at least one first roller body is preferably arranged on the same roller body track of the pull-out guide as the at least two second roller bodies. The at least two second roller bodies are arranged at the end side of the roller body track in an especially preferred way. These embodiments represent especially advantageous arrangements of the first and second roller bodies within the roller body cage or cages, in which the advantages in accordance with the invention are most impressive. A roller body track is defined by the trajectory of a roller body during actuation of the pull-out guide. Roller bodies situated behind one another in the pull-out direction thus run on the same roller body track.

In a further embodiment of the pull-out guide, roller bodies are provided in addition to the first and second roller bodies which differ from the first and second roller bodies. A pull-out guide in accordance with the invention is thus not limited to the presence of the first and second roller bodies, but can also be implemented in pull-out guides that comprise one type of rolling body or several types of further roller bodies. They can absorb loads under especially high loading of the pull-out guide or under specific tilting loads, especially in the case of partly or fully extended pull-out guides, and they further improve the running properties.

In a further embodiment of the pull-out guide, the at least one second roller body may be made of steel and/or the at least one first roller body of polyoxymethylene (POM) or polypropylene (PP). These combinations of materials are especially suitable for implementing the invention, especially since the aforementioned materials have a modulus of elasticity of a magnitude which is highly suitable.

BRIEF DESCRIPTION OF THE DRAWINGS

FIG. 5a shows a schematic diagram illustrating the loading of the different roller bodies depending on the loading of a pull-out guide in accordance with the application;

FIG. 5b shows a schematic diagram illustrating the sonic pressure level based on a loading of the pull-out guide;

FIGS. 6a to 6c respectively show a top view of a roller body cage with different arrangements of the various roller bodies;

FIG. 7a shows a perspective view of a roller body cage with roller bodies in a second embodiment;

FIG. 7b shows a sectional view of the roller body cage of the second embodiment, and FIG. 7c shows a side view of the roller body cage of the second embodiment.

FIG. 1 shows a first embodiment of a pull-out guide in a perspective view. The pull-out guide comprises at least two pull-out rails, and three in this case, which are preferably linearly displaceable relative to each other, i.e. an outer pull-out rail 10, a middle pull-out rail 20 and an inner pull-out rail 30. The outer pull-out rail 10 may be connected by means of fastening means 11 which are used for fixing the outer pull-out rail 10 to a furniture body for example. The inner pull-out rail 30 comprises fastening means 31, which can be fixed to a movable furniture part such as a drawer. The outer pull-out rail 10 and the inner pull-out rail 30 are shown in a cutaway view in FIG. 1 in order to provide insight into the inner configuration of the pull-out guide.

Figure 1:
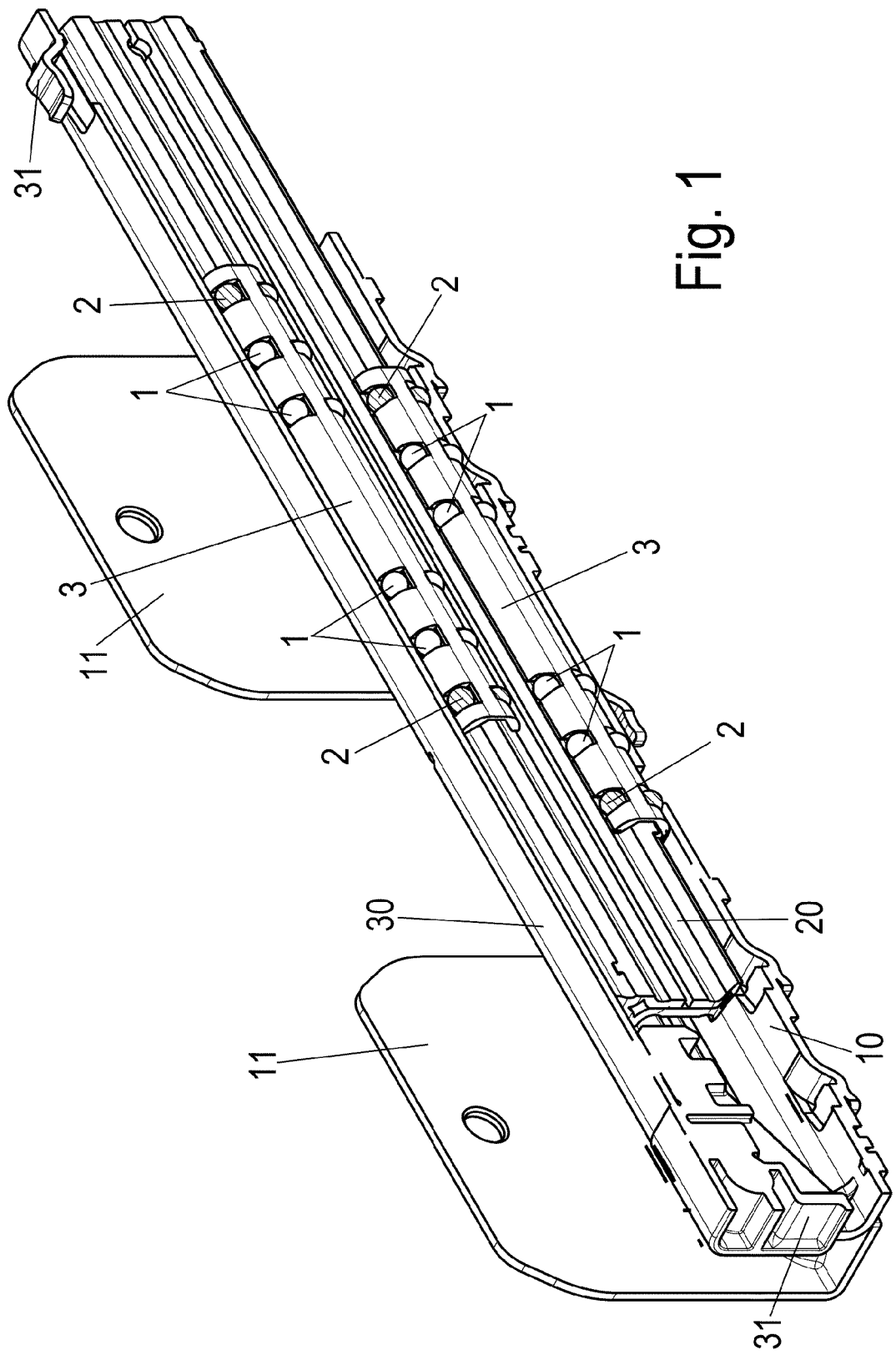
FIG. 1 shows a perspective view of a first embodiment of a pull-out guide.

The pull-out guide shown in FIG. 1 shall merely be understood as an illustrative embodiment. The invention can also be implemented in pull-out guides that are arranged differently. It is neither dependent on three rails moved relatively to one another and shown in FIG. 1, nor on the geometric arrangement of the rails.

Figure 2:
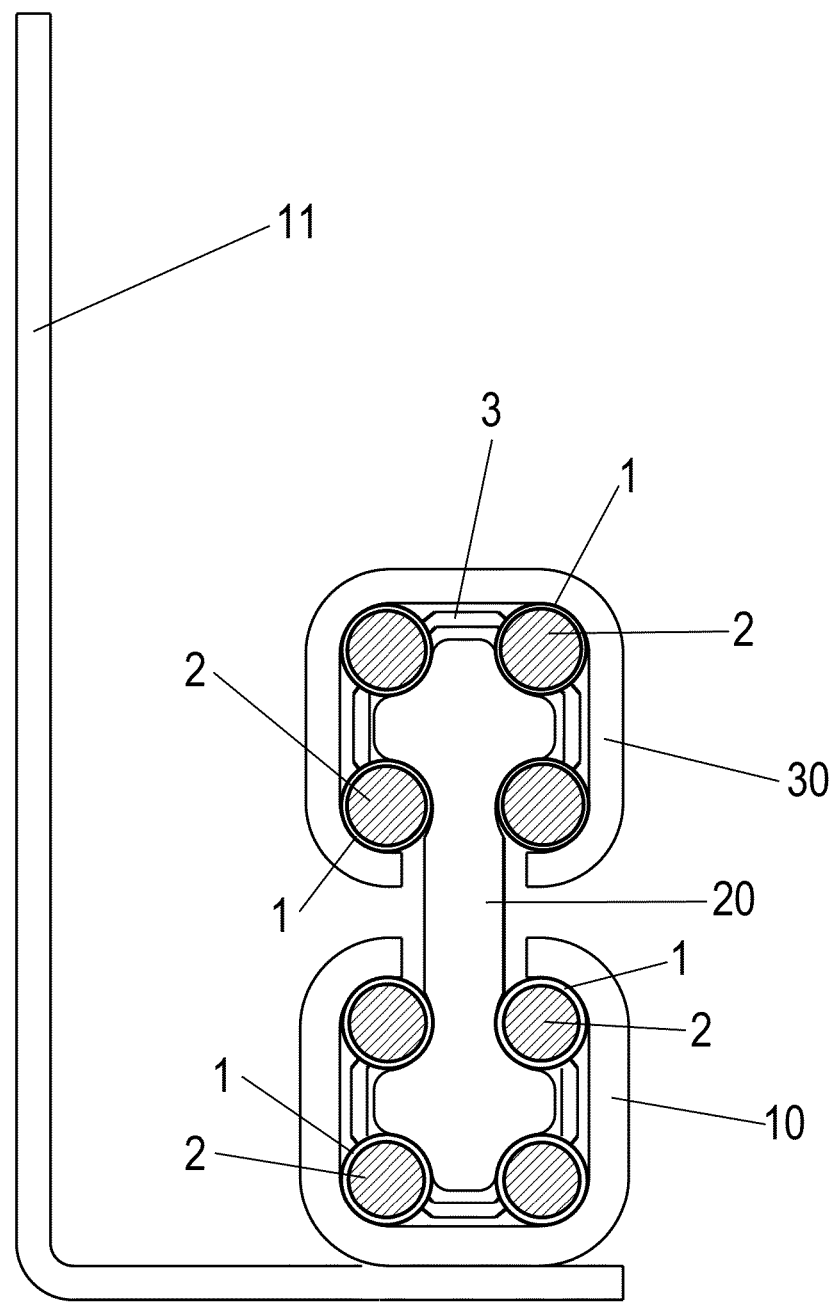
FIG. 2 shows a sectional view of the pull-out guide of FIG. 1.

FIG. 2 shows the pull-out guide of FIG. 1 in a cross-sectional view. The outer pull-out rail 10 and the inner pull-out rail 30 each have a square profile with rounded corners, wherein the opposite sides are provided with a longitudinal slit, so that a C-shaped section is generally obtained. The outer pull-out rail 10 and the inner pull-out rail 30 are preferably made of steel sheet at least in the middle region. Plastic plugs can be inserted in the end regions. As is shown in FIG. 1, the fastening means 31 may be formed by such plastic plugs.

A middle pull-out rail 20 is provided which has a profile in the form of two cross-shaped sections connected by a web. The middle pull-out rail 20 is guided with one each of its cross-shaped sections via a roller body device in the outer pull-out rail 10 or the inner pull-out rail 30.

Figure 3:
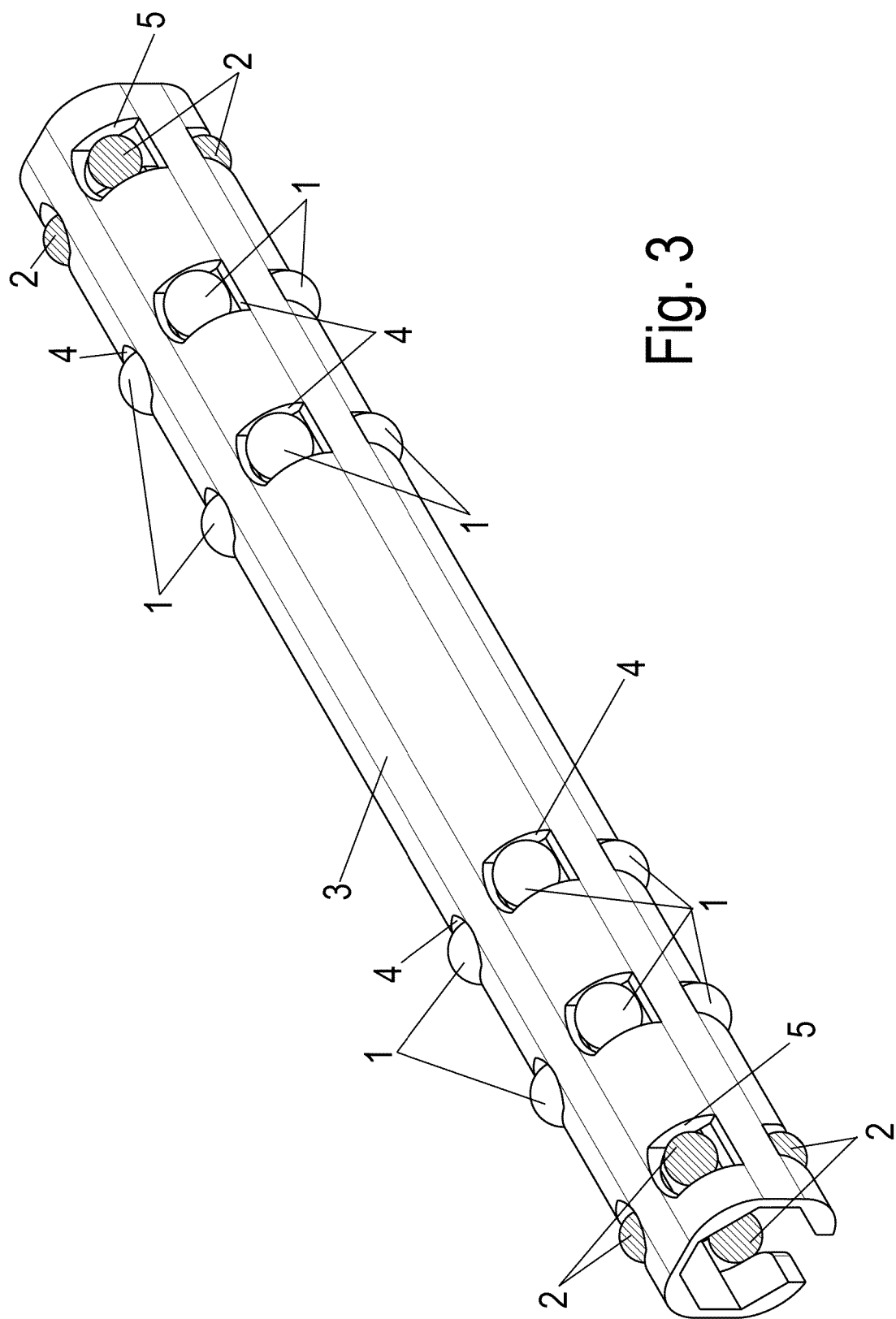
FIG. 3 shows a perspective view in detail of a roller body cage in the first embodiment of the pull-out guide.

The roller bearing device used in the first embodiment is shown in closer detail in FIG. 3 in a perspective view. It comprises an elongated roller body cage 3 which is C-shaped in its profile and in which a plurality of roller bodies 1, 2 are arranged in the roller body bearing points 4, 5. Balls are used as roller bodies 1, 2 in the illustrated embodiment. It is understood that other types of roller bodies can also be used in pull-out guides in accordance with the invention, e.g. rollers or bodies shaped in form of drums or ellipsoid bodies. Such roller bodies can also be held in a rotatably mounted way with or without bearing pins in respectively arranged roller body cages.

Roller bodies 1, 2 are arranged in six planes perpendicular to the longitudinal direction of the roller body cage 3, which roller bodies are grouped in two groups with three respective levels in the outer region of the roller body cage 3. Four respective roller bodies 1, 2 are respectively provided in each of the planes, which bodies are respectively positioned in the assembled state of the pull-out guide in one of the rounded corners of the outer pull-out rails 10 or the inner pull-out rail 30. In the illustrated roller body cage 3, the roller bodies 1, 2 thus run on three different roller body tracks. A roller body track is defined by the trajectory of a roller body during the actuation of the pull-out guide. Roller bodies which are located in succession in the pull-out direction of the pull-out guide or in the longitudinal direction of the roller body cage 3 run on the same roller body track.

The roller body track 3 can be made of plastic or metal for example, especially sintered metal. A roller body cage made of a multi-component material is also possible, wherein a base body can be provided which is made of a dimensionally stable material and the bearing regions can consist of a plastically deformable material such as plastic. It is advantageous if at least the material of the bearing points has tribologically optimised properties, so that a torque necessary for rotating the roller bodies is reduced. This is also achieved by lubricants which are already situated in the material of the bearing points.

Different types of roller bodies are provided within each of the two roller body cages 3, i.e. first roller bodies 1 which are shown in the drawings without hatching, and second roller bodies 2 which are shown with the hatching. The first roller bodies 1 and the second roller bodies 2 differ from each other both with respect to their diameter and also with respect to their hardness, which is described on the basis of its modulus of elasticity for example. The first roller bodies 1 have a lower modulus of elasticity, which means they are therefore softer than the second roller bodies 2 and they have a greater diameter in the unloaded state than the second roller bodies 2. The bearing points 4 and 5 for the different types of roller bodies may dimensioned differently in order to compensate for the different dimensions of the first and second roller bodies. The bearing points 4, 5 are arranged in this case in such a way that the respective first and second roller bodies 1, 2 can be pressed into the bearing points 4, 5, wherein the edges of the bearing points 4, 5 will expand during the pressing and/or the roller bodies 1, 2 will be compressed. After the insertion into the bearing points 4, 5, the roller bodies 1, 2 are held to the highest possible extent in a freely rotatable manner in the roller body cage 3 in the respective bearing points 4, 5.

The roller bodies 1, 2 can be made of metals such as brass, bronze, aluminium or steel, or of non-metals such as polyamide, polyoxymethylene (POM), polyethylene (PE), polypropylene (PP), thermosetting plastics or ceramics. A possible combination of softer roller bodies 1 and harder roller bodies 2 is provided for example by the combination of materials of POM or PP for the first roller body 1 and steel for the second roller body 2.

Figure 4:
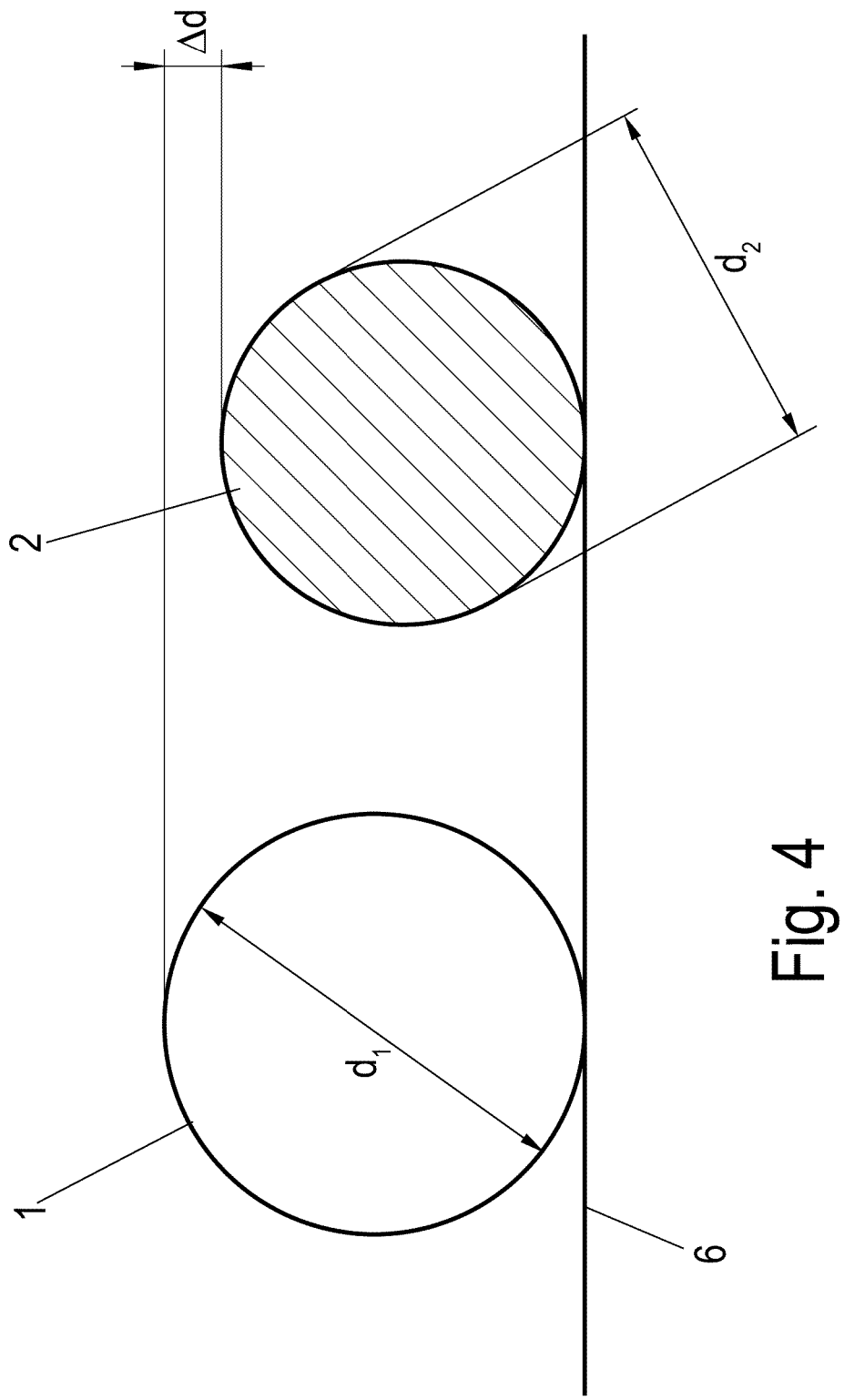
FIG. 4 shows a schematic view of the proportions in size of the different roller bodies.

FIG. 4 illustrates the relative sizing of the first and second roller bodies. A first roller body 1 and a second roller body 2 are shown on a plane 6 next to one another. The first roller body 1 has a first diameter $d_1$, and the second roller body 2 has a second diameter $d_2$. The different diameter is indicated by a difference in diameter $\Delta d = d_1 - d_2$. $\Delta d$ is greater than zero, because according to the definition the first diameter $d_1$ is greater than the second diameter $d_2$.

The functionality of the pull-out guide in accordance with the disclosure will be explained in closer detail by reference to two schematic diagrams shown in FIG. 5.

As a result of the greater diameter of the first roller bodies 1, the pull-out rails 10, 20 and 20, 30 only run substantially on the first roller bodies 1 in the case of low loading of the pull-out guide. The smaller second roller bodies 2 either have no contact to any of the two pull-out rails 10, 20 or 20, 30, or run on one of the two pull-out rails, e.g. the respective bottom one for example. With increasing loading of the pull-out guide, the larger but softer first roller bodies 1 are compressed increasingly until at least one of the first roller bodies 1 is compressed to such an extent from a specific loading of the pull-out guide that at least one of the second roller bodies 2 comes into contact with the two adjacent pull-out rails 10, 20 or 20, 30. Loading of the pull-out guide that goes beyond this level is then substantially taken up by the second roller bodies 2, which as a result of their greater modulus of elasticity are compressed to a lower extent even in the case further rising loading. In the case of a great difference in the moduli of elasticity between the first and the second roller bodies 1, 2, as is provided for example in the case of a material combination of POM or PP relative to steel, the second roller bodies 2 virtually act like a boundary.

FIG. 5a illustrates the load distribution on the first and second roller body 1, 2. The abscissa (x-axis) indicates the total load of a pull-out guide, which is shown as the mass m with which the entire pull-out guide is loaded. The ordinate (y-axis) shows the partial masses $m_1$, $m_2$ of the total mass m, which are absorbed by the first roller bodies 1 ($m_1$) and the second roller bodies 2 ($m_2$). A loading curve 41 indicates the magnitude of the partial mass $m_1$ which is absorbed by the first roller bodies 1, and a loading curve 42 indicates the partial mass $m_2$ which is absorbed by the second roller bodies 2.

If the loading of the pull-out guide acts in a retracted state of the pull-out guide and in a form of a loading acting perpendicularly in the downward direction on the horizontally aligned rails, the load divides evenly at first onto all existing first roller bodies 1 and thereafter onto all present first and second roller bodies 1, 2. In this case, which occurs for example in the case of a retracted and evenly loaded drawer, a transitional point where the second roller bodies are loaded can be indicated precisely. In the case of an uneven loading of the drawer or in the case of a partial pull-out or complete pull-out of the pull-out guide, a torque acting on the pull-out rails 10, 20, 30 is obtained in addition to the force acting perpendicularly on the rails. This leads to the consequence that the first roller bodies 1 are loaded and thus compressed to a differently great extent at different positions within the roller body cage 3. The transition of the load from the first roller bodies 1 to the second roller bodies 2 depending on the loading of the pull-out guide is then arranged to a lesser discrete extent, but instead is distributed over a wider loading area. The curves 41, 42 thus continuously change their ascending slope, especially in the transitional region.

FIG. 5b shows a diagram with the resulting advantageous effect on the noise development during the movement of the pull-out guide. The abscissa again shows the total loading of a pull-out guide, which is shown as the mass m with which the entire pull-out guide is loaded. The ordinate shows the sound pressure level L in decibels which is emitted by the pull-out guide.

Two sound pressure levels 43, 44 are shown for comparison purposes, of which the sound pressure level 43 shows the rolling noises of a pull-out guide which is equipped exclusively with a hard roller bodies such as steel balls or rollers. Relatively high rolling noises can be seen especially under low loads (low mass m).

In contrast to this, the rolling noises under low loading in a pull-out guide in accordance with the disclosure with softer first rolling bodies 1 and harder second rolling bodies 2 are lower over the entire illustrated loading range. This can be seen by the sound pressure level 44. The achieved decrease in the noise is especially strong under low loading, in which only or substantially the softer first roller bodies 1 are loaded. Under high loads, in which the load is also absorbed by the second roller bodies 2 in the pull-out guide in accordance with the application, the noise pressure levels 43, 44 approach each other.

In order to ensure in the lower loading range that the first roller bodies 1 are capable of providing their noise-reducing effect in engagement with the pull-out rails 10, 20, the difference in magnitude $\Delta d$ between the diameters $d_1$ and $d_2$ of the first and second roller bodies 1, 2 must fulfil specific criteria. The roller bodies 1, 2 have specific unavoidable production tolerances with respect to their diameter. They are typically greater especially in the case of the first roller bodies 1 which are made of the soft material than the production tolerances of the harder second roller bodies 2. Under the assumption of production tolerances $\Delta d_1$ and $\Delta d_2$ which are equally large with respect to larger and smaller diameters, the actual diameters of the first roller body 1 lie within the range $d_1 \pm \Delta d_1$ and those of the second roller body 2 lie within the range $d_2 \pm \Delta d_2$. $d_1$ and $d_2$ then respectively designate the nominal diameter.

If all first roller bodies 1 used within a roller body cage are larger than all second roller bodies 2 within the roller body cage, the first roller bodies 1 produce the decrease in noise during movement of the pull-out rails under low loads. In order to ensure this, the difference in diameter $\Delta d$ relating to the nominal diameter $d_1$, $d_2$ must be chosen greater than the sum total of the production tolerances $\Delta d_1$ and $\Delta d_2$. Since the production tolerances in the second harder roller bodies 2 are usually considerably lower than in the first softer roller bodies 1, the production tolerance $\Delta d_2$ may optionally be neglected in relation to the production tolerances $\Delta d_2$, so that this criterion is simplified in the respect that the difference in diameter $\Delta d$ is chosen greater than the production tolerance $\Delta d_1$.

If a non-symmetric production tolerance range is assumed, it is necessary to consider the bottom tolerance range for the tolerance in the diameter of the first roller bodies 1 and the upper tolerance range for the tolerance in the diameter of the second roller bodies 2 in the determination of the difference in the diameter Δd of the nominal diameters $d_1$, $d_2$. It therefore applies that the sum total of the differences between the nominal diameter $d_1$ and the smallest possible diameter of the softer first roller bodies 1 and the greatest possible diameter and the nominal diameter $d_2$ of the harder second roller bodies 2 determine a lower limit for the difference in diameter Δd.

It is advantageous if furthermore the different moduli of elasticity between the softer first roller bodies 1 and the harder second roller bodies 2 are also considered in the lower limit as a further criterion for the noise-reducing effect in the bottom loading range in addition to the production tolerances. The greater the difference between the moduli of elasticity, the greater the minimum amount should be which is added to the previously mentioned production tolerance $Δd_1$ or to the sum total of the production tolerances $Δd_1+Δd_2$. The minimum amount should advantageously be at least 0.01 mm (millimeters).

In addition, an upper limit for the difference in diameter Δd must be taken into account. One criterion for this upper limit for Δd considers the loadability of the material of the first softer roller body 1. The first roller bodies 1 could be destroyed if they are compressed to an excessive extent with rising loading of the pull-out guide before the second roller bodies 2 limit the further compression of the first roller bodies 1. A destruction of the first roller bodies 1 will commence once the range of the elastic deformation of the first roller bodies 1 is left. The range of the elastic deformation of the first roller bodies $d_1$ is left once a yield point of the material of the first rolling body 1 has been exceeded. The yield point relates to a pressure loading occurring during the static compression, i.e. the compression without rotational movement of the first roller bodies 1, and also to a shearing loading which occurs during a rotational movement of the first roller bodies 1 in the compressed state.

A further criterion for the upper limit of the difference in diameter Δd is the loading of the pull-out guide, i.e. the selected loading weight of a drawer for example, from which the at least one second harder roller body 2 shall carry the loading to a substantial extent. If this selected loading weight is close to the weight of the unloaded drawer, the upper limit of the difference in diameter Δd is close to the bottom limit of the difference in diameter Δd. If the selected loading weight of the drawer is close to the maximum weight of the drawer, the upper limit of the difference in diameter Δd must be chosen remote from the bottom limit of the difference in diameter Δd.

It is ensured by determining the bottom limit of the difference in diameter Δd that the noise development is minimised during the pull-out of the drawer. By determining the upper limit of the difference in diameter Δd, it is possible on the one hand to set the change in load between the first softer and second harder roller bodies on the one hand and to prevent overloading of the first softer roller bodies on the other hand.

For a typical application of a pull-out guide for drawers, in which the first roller bodies 1 are made of POM and the second roller bodies 2 are made of steel and which is configured for a loading of 45 kg (kilograms) at a pull-out length of 300 mm, the following condition is obtained in a nominal second diameter $d_2$ of the second roller bodies 2 of 3.9 mm for the difference in diameter Δd: 0.02 mm<Δd<0.17 mm. The bottom limit of 0.02 mm is predetermined by the production tolerances and the minimum amount for this pairing of materials of POM/steel, the upper limit of 0.17 mm is determined by the plastic deformations and thus the material failure of the first roller bodies 1. A modulus of elasticity of 26,000 N (Newton)/mm² is assumed for POM and a modulus of elasticity of 210,000 N (Newton)/mm² is assumed for steel, wherein 16 first roller bodies 1 and 8 second roller bodies 2 are provided per roller body cage 3 and the pull-out guide has a basic configuration according to the first embodiment (FIG. 1 to FIG. 3).

The following is obtained for a selection of material of PP for the first roller body 1 with a modulus of elasticity of 1500 N (Newton)/mm² with the same assumptions for the difference in diameter Δd otherwise: 0.03 mm<Δd<0.12 mm.

FIG. 6 shows in the partial images b) and c) alternative distributions of the first and second roller bodies 1, 2 within the roller body cage 3. The constellation already indicated in the first embodiment (FIG. 1 to FIG. 3) is repeated for comparison in the partial image a) again. Notice must be taken that both the absolute number of the first and second roller bodies 1, 2 and also the ratio of the number of the first and second roller bodies 1, 2 can be varied within the scope of the application in relation to the embodiments shown here. Furthermore, further different roller bodies can also be used within a pull-out guide and also within the roller body cages 3, which different roller bodies differ from the first and second roller bodies 1, 2.

FIG. 7 shows a roller body cage 3 for a further embodiment of a pull-out guide. In the case of a roller body cage 3, which is shown in this case in a perspective view (partial image 7*a*), in a sectional view (partial image 7*b*) and in a side view (partial image 7*c*), the first and second roller bodies 1, 2 are arranged in three rows with four first roller bodies 1 and two second roller bodies 2. In this case, the balls are arranged in the longitudinal direction in one of the rows in an offset manner with respect to the other two rows. The teachings of the application can principally be applied to a plurality of embodiments of roller body cages.

The invention claimed is:

1. A pull-out guide for furniture parts which can be moved relative to one another, the pull-out guide having at least two pull-out rails, between which at least one first roller body and at least one second roller body are arranged, which roller bodies are rotatably held in at least one roller body cage, wherein the at least one first roller body has a greater nominal diameter and a lower modulus of elasticity than the at least one second roller body, wherein the difference in diameter (Δd) between a first nominal diameter of the first roller body and a second nominal diameter of the second roller body is greater than a lower limit which is at least as great as a production tolerance (Δd1) in the diameter of the first roller body, wherein the lower limit is at least as great as the production tolerance (Δd1) in the diameter of the first roller body plus a production tolerance (Δd2) in the diameter of the second roller body, plus a minimum amount of at least 0.01 mm, wherein an upper limit is provided for the difference in diameter (Δd), wherein the upper limit is dependent on a loading of the pull-out guide, in which the at least one second roller body is subjected to a pressure load, and wherein the upper limit is maximally as great as the sum total of the production tolerance (Δd1) in the diameter of the first roller body and a maximum amount of at most 0.3 mm.

2. A pull-out guide according to claim 1, wherein the minimum amount is dependent on the difference of the modulus of elasticity between the first and the second roller bodies.

3. A pull-out guide according to claim 1, wherein the difference in diameter (Δd) at the upper limit is sufficiently low to preclude reaching a yield point of the first roller body during the compression of the at least one first roller body to the nominal diameter of the second roller body.

4. A pull-out guide according to claim 1, wherein the roller bodies between the at least two pull-out rails run on at least two roller body tracks, wherein at least two roller bodies situated behind one another on one of the roller body tracks are second roller bodies.

5. A pull-out guide according to claim 4, wherein the at least one first roller body is arranged on the same roller body track of the pull-out guide than the at least two second roller bodies.

6. A pull-out guide according to claim 4, wherein the at least two second roller bodies are respectively arranged at the end sides of the roller body track.

7. A pull-out guide according to claim 1, wherein the at least one second roller body consists of steel.

8. A pull-out guide according to claim 1, wherein the at least one first roller body consists of POM or PP.

\* \* \* \* \*